No. 635,107. Patented Oct. 17, 1899.
E. C. MERSHON.
ATTACHMENT FOR EDGING OR RIPPING SAWS.
(Application filed Mar. 28, 1899.)
(No Model.)
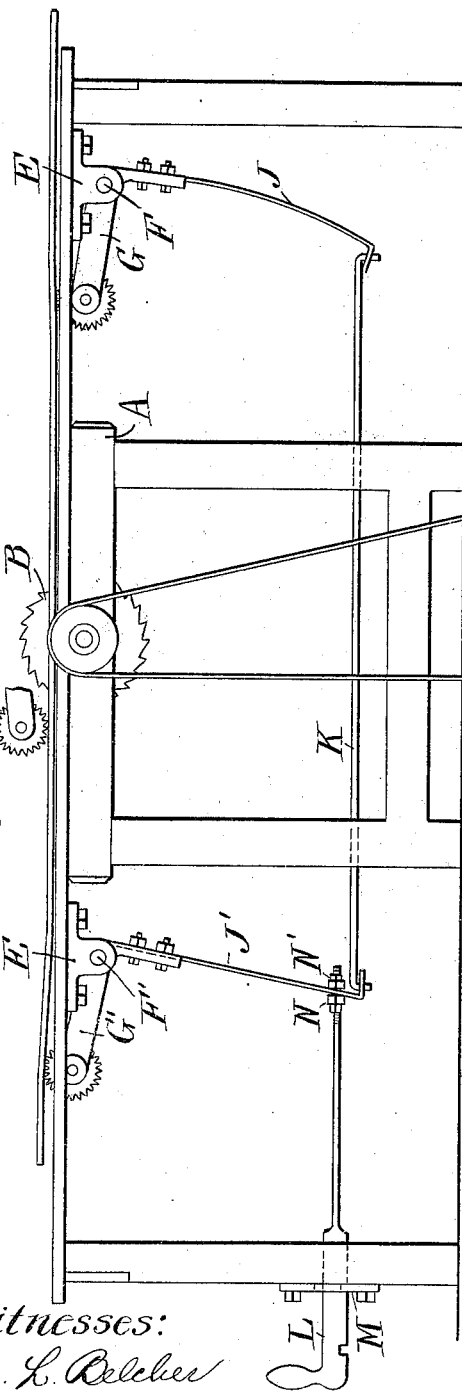
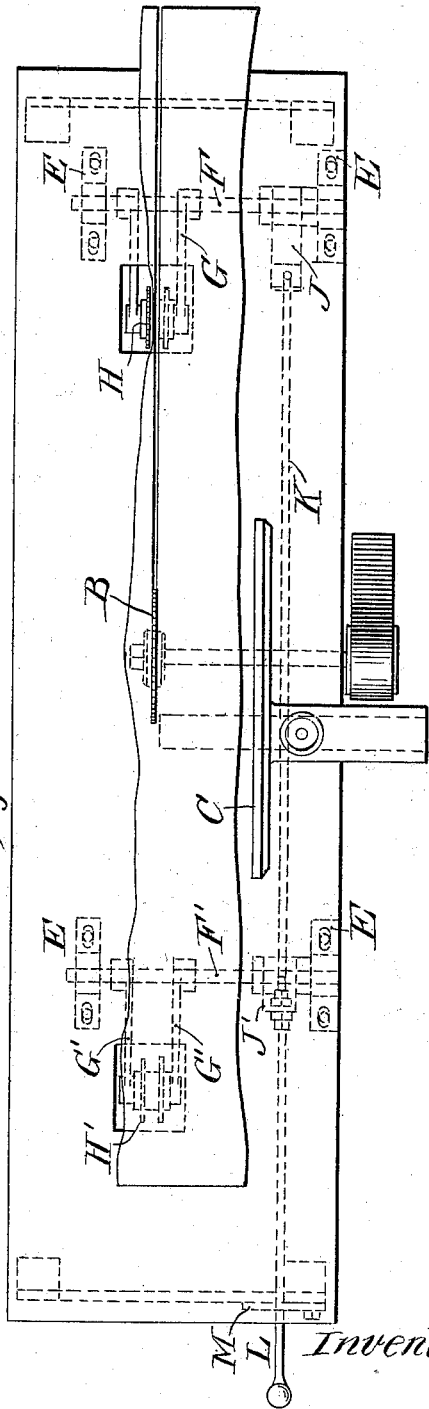
Witnesses:
Inventor
Edward C. Mershon
By his Atty

UNITED STATES PATENT OFFICE.

EDWARD C. MERSHON, OF SAGINAW, MICHIGAN.

ATTACHMENT FOR EDGING OR RIPPING SAWS.

SPECIFICATION forming part of Letters Patent No. 635,107, dated October 17, 1899.

Application filed March 23, 1899. Serial No. 710,739. (No model.)

*To all whom it may concern:*

Be it known that I, EDWARD C. MERSHON, a citizen of the United States, and a resident of Saginaw, in the county of Saginaw and State of Michigan, have invented a certain new and useful Attachment for Edging or Ripping Saws, of which the following is a specification.

This invention relates to an attachment for power-driven edging or ripping saws, and has for its object the construction of a simple and most efficient means for producing a straight edge on a crooked piece of lumber where it is impracticable to use the ordinary fence or guide—as, for instance, in taking the first edge off a board, both of whose edges are crooked or irregular. It is now the practice among sawyers to guide such a board as best they can by their hands in taking off the first edge, and then to run the edge so produced against the fence or guide in ripping off the other edge of the board, which will leave the board with one straight edge. Then the board must go through the saw again with this straight edge against the guide, thereby necessitating a third handling of the board and causing an undue waste of lumber. This mode of procedure is more difficult and wasteful in an edging-machine equipped with a band-saw than in one equipped with a circular saw, because the greater breadth of the circular saw assists somewhat in guiding the lumber. The present invention is equally well adapted for use with either form of sawing-machine. It is, in effect, a guide, though it engages the lumber on its face instead of at the edge and prevents lateral displacement thereof. In its use the ordinary fence or guide is unnecessary except when boards of a fixed width are to be produced. Then the latter may be used after one straight edge is made.

The invention consists in the construction, combination, and arrangements of parts hereinafter fully described and set forth in the claims.

In the accompanying drawings, which form a part of this specification, Figure 1 represents in side elevation a sawing-machine equipped with the attachment of this invention, tion, which may be termed a "straightening" device. Fig. 2 is a plan of the parts shown in Fig. 1, a board being represented as in progress through the machine.

In the drawings, a saw-bench, as A, of usual form, is shown as provided with a circular saw B. This saw is simply indicative of any saw, whether circular, jig, or band saw, and in connection therewith is shown a fence or guide C of usual form.

The straightening device or attachment is specially well adapted for use with a power-feed rip-table or edger, and the feeding saw or roll of such a machine is indicated at D, its supporting-frame being broken away and the driving mechanism therefor being omitted.

The function of the straightening device is to maintain a board in parallelism with the saw when it has been once started through the machine. It prevents lateral displacement of the lumber and a straight cut or edge is produced. To this end there are attached to the table-top at a suitable distance in front of and to the rear of the saw two shafts, as F F', parallel with the saw-arbor and at right angles to the direction in which the material is to be fed. To each shaft are rigidly attached two arms G and G', extending horizontally or nearly so. In their free ends are journal-boxes which receive the rollers H and H'. These rollers may be termed "spur-rollers"—that is, there are suitable projecting points therefrom which would engage with timber or material passing over them. Also attached to the shafts F and F' and hanging pendent therefrom are two spring-strips J and J', and connecting these two springs is a link K, and from J', extending from the front of the table to a convenient place within reach of the operator, is a handle L. When it is desired to bring the straightening device into service, this handle L is drawn forward and retained in position by a notch in the lower edge thereof engaging with an iron plate M. The two spur-rollers H and H' may be raised to any elevation by adjusting-nuts and jam-nuts N and N', as shown in Fig. 1. The flexible arms or strips J and J' will allow the shaft F to rotate slightly, thus allowing the spur-rollers H and H' to conform with crooked material passing over the table, the purpose of said springs being to retain the spurs of the rollers always in contact with the timber in progress through the machine.

The shafts or axles F and F' can be made adjustable so as to insure straight feeding of the lumber. For this purpose the journal-boxes E, which support them and which are attached to the bottom of the table-top, may be slotted where the bolts pass through, as indicated in Fig. 2, thereby permitting the arms G or G', with their feed-rolls, to be "cut around." Thus in ripping material should the line of cut be curved either of the shafts F or F' may be shifted so as to correct this result.

In ripping strips and lumber which have been previously ripped or sized—as, for instance, making a six-inch strip into two three-inch pieces of flooring—if the edges are not too crooked or if the lines forming the edges have comparatively long curves it is desirable that this stock be ripped parallel with said edges in order that the six-inch strip may yield the two three-inch pieces of flooring. If, on the other hand, because of kiln-drying or other reasons short curves arise which would prevent these strips being fed through a planer or matcher and properly matched, or if the curves are so short that a carpenter could not lay the floor and make a workmanlike job, it is then desirable to rip off the projecting lumps and curves and prepare a straight edge. This straight edge should then be fed through against the guide C, which has been adjusted for the desired width. As will be noted, the straightening device can be brought into use or not at will and when not in use is entirely out of the way.

Obviously in machines where the power-feed above described is not used the rolls H may be made to act as feed-rolls by applying power thereto in substantially the same way as is now in use with such feeding-rolls as D. It is also obvious that the straightening device instead of being located under or in the bed of the sawing-machine may be located above it and made to engage the top surface of the lumber, the rolls being flexibly mounted in either instance so as to compensate for crooks and curves in the lumber.

Though the spring-pressure may be applied to the rolls H and regulated in any convenient way, that illustrated is considered the simplest and most efficient.

The invention claimed is—

1. The combination with a sawing-machine, of spur-rolls located in front of and to the rear of the saw, each of said rolls being independently spring-pressed for engagement with the lumber, and means for adding tension to the springs of both rolls and for throwing both the rolls into and out of engagement with the lumber at will.

2. The combination with a sawing-machine of spur-rollers located in front of and to the rear of the saw, for guiding the lumber, the bearings for the rollers being laterally adjustable so as to insure a right-line cut, a tension device for each roller for pressing it against the lumber, and means for raising or depressing the rollers at will.

3. The combination with the saw-arbor, of shafts journaled to the saw-table parallel to the arbor, arms fixed to said shafts and carrying spur-rolls in their free ends, plate-springs attached to and depending from said shafts, a link connecting the free ends of said springs, and an arm connected with one of said springs for adding tension thereto and for throwing the rolls into and out of use.

Signed at Saginaw, in the county of Saginaw and State of Michigan, this 8th day of March, A. D. 1899.

EDWARD C. MERSHON.

Witnesses:
JOHN C. WHITE,
CHAS. D. CURTIS.